United States Patent
Mikajiri

(10) Patent No.: US 11,381,187 B2
(45) Date of Patent: Jul. 5, 2022

(54) MOTOR CONTROL APPARATUS AND CONTROL METHOD FOR MOTOR CONTROL APPARATUS

(71) Applicant: CANON KABUSHIKI KAISHA, Tokyo (JP)

(72) Inventor: Satoru Mikajiri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/125,706

(22) Filed: Dec. 17, 2020

(65) Prior Publication Data

US 2021/0203260 A1 Jul. 1, 2021

(30) Foreign Application Priority Data

Dec. 26, 2019 (JP) .............................. JP2019-236293

(51) Int. Cl.
  *H02P 21/20* (2016.01)
  *H02P 6/28* (2016.01)
  *H02P 21/18* (2016.01)

(52) U.S. Cl.
  CPC .............. *H02P 21/20* (2016.02); *H02P 6/28* (2016.02); *H02P 21/18* (2016.02)

(58) Field of Classification Search
  CPC .... H02P 6/21; H02P 21/00; H02P 6/04; H02P 25/089; H02P 21/20; H02P 6/28; H02P 21/18; H02P 21/34; G05B 2219/42122; G05B 2219/43175; G05B 2219/39188; G05B 2219/41138
  See application file for complete search history.

(56) References Cited

U.S. PATENT DOCUMENTS

| | | | | |
|---|---|---|---|---|
| 9,233,815 B2* | 1/2016 | Lee | ......................... | B66B 1/304 |
| 2008/0258656 A1* | 10/2008 | Kawasaki | ............. | B60L 3/0046 |
| | | | | 318/148 |
| 2014/0261306 A1* | 9/2014 | Maeda | .................... | F02D 25/00 |
| | | | | 123/319 |
| 2015/0311845 A1* | 10/2015 | Nagata | .................... | H02P 21/26 |
| | | | | 318/400.02 |
| 2015/0318804 A1 | 11/2015 | Maeshima | | |
| 2018/0043928 A1* | 2/2018 | Fujita | .................... | H02P 29/028 |
| 2018/0198398 A1* | 7/2018 | Strong | .................... | H02P 21/24 |

FOREIGN PATENT DOCUMENTS

JP  2009166919 A  *  7/2009  ............ E05F 15/643
JP  2015213398 A     10/2018

* cited by examiner

*Primary Examiner* — Bickey Dhakal
(74) *Attorney, Agent, or Firm* — Canon U.S.A., Inc. IP Division

(57) ABSTRACT

A motor control apparatus that controls a first motor and a second motor that are synchronized includes a first motor control unit configured to control a driving voltage of the first motor based on the torque current instruction value, which is output based on a torque current of the first motor for the first motor, and a second motor control unit configured to control a driving voltage of the second motor based on the torque current instruction value, which is output based on a torque current of the second motor for the second motor, wherein the first torque correction unit or the second torque correction unit corrects the torque current instruction value for the first motor or the toque current instruction value for the second motor based on the torque current of the first motor and the torque current of the second motor.

10 Claims, 5 Drawing Sheets

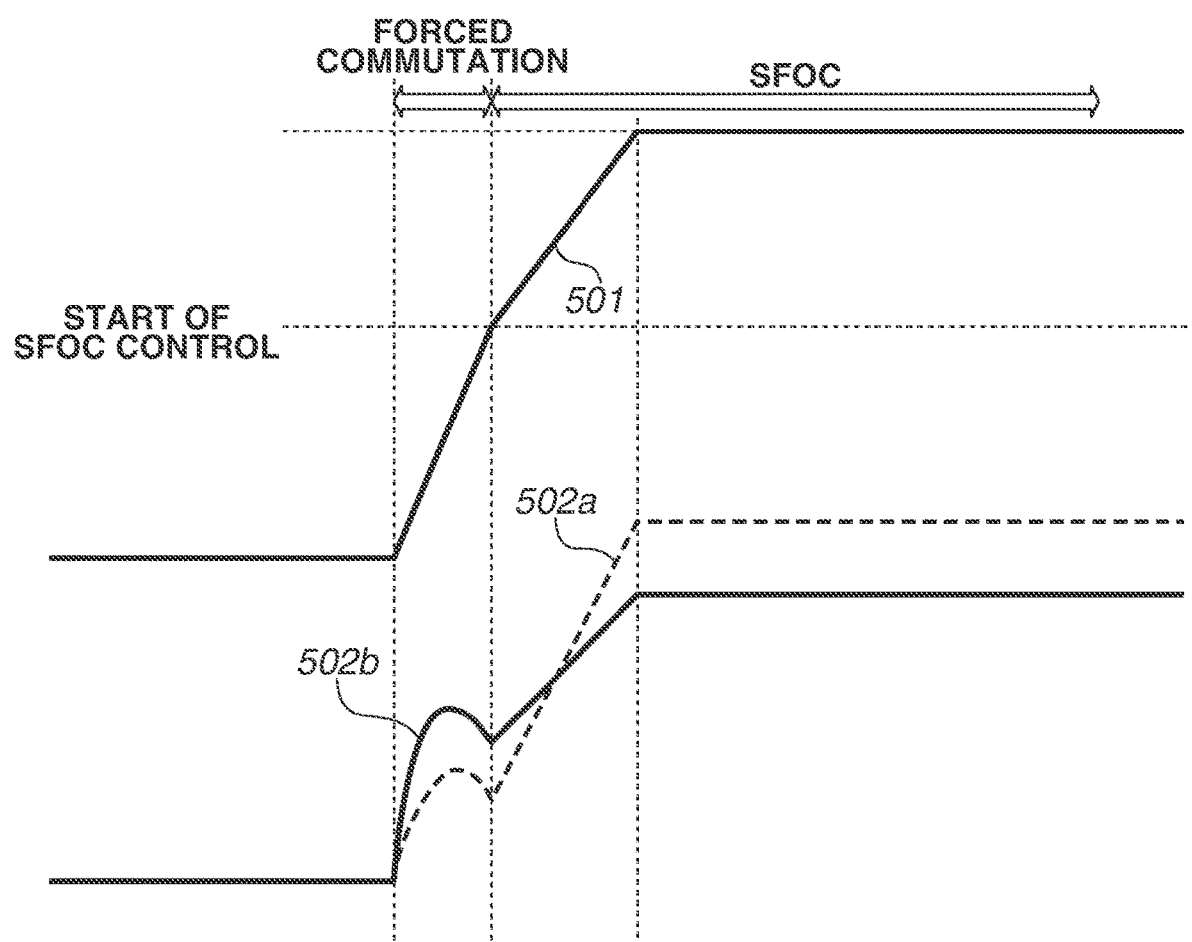

MOTOR CONTROL APPARATUS AND CONTROL METHOD FOR MOTOR CONTROL APPARATUS

BACKGROUND

Field of the Disclosure

The present disclosure relates to a motor control apparatus and a control method for the motor control apparatus.

Description of the Related Art

If a plurality of motors each having a shaft is rotated, loads of the shafts of motors may vary. Such an issue occurs due to displacement of a position of the motor of each shaft caused by a mechanical error in mounting position or aging degradation. Accordingly, a sensor such as a hall sensor or an encoder is generally used to detect a rotation speed of the motor and the positional displacement. In recent years, however, sensorless vector control (hereinafter referred to as sensorless field oriented control (SFOC)) that estimates a rotation speed from three-phase current values without a sensor has been widely used (Japanese Patent Application Laid-Open No. 2015-213398).

Application of unequal loads to the respective shafts of the plurality of motors causes an increase in power consumption of a motor having a larger load. A product life cycle of the motor consuming more power is shortened by influence of temperature and electro-migration (EM).

Moreover, in an apparatus that drives a belt by a plurality of shafts, the belt may be distorted due to displacement of a rotational angle or position of each shaft caused by mechanical degradation or an error in mounting position of a mechanical element such as a gear. Such belt distortion leads a malfunction of the apparatus. In addition, since correction of the belt distortion generally needs sophisticated calculation processing during motor control, a cost of the calculation processing increases.

SUMMARY

Some embodiments of the present disclosure are directed to correction of motor torque of any of a first motor and a second motor that are synchronized.

According to an aspect of some embodiments, a motor control apparatus that controls a first motor and a second motor that are synchronized includes a first conversion unit configured to convert a current flowing in the first motor into a torque current, a second conversion unit configured to convert a current flowing in the second motor into a torque current, a first torque correction unit configured to output a torque current instruction value for the first motor based on the torque current of the first motor, a second torque correction unit configured to output a torque current instruction value for the second motor based on the torque current of the second motor, a first motor control unit configured to control a driving voltage of the first motor based on the torque current instruction value for the first motor, and a second motor control unit configured to control a driving voltage of the second motor based on the torque current instruction value for the second motor, wherein the first torque correction unit or the second torque correction unit corrects the torque current instruction value for the first motor or the toque current instruction value for the second motor based on the torque current of the first motor and the torque current of the second motor.

Further features of various embodiments will become apparent from the following description of exemplary embodiments with reference to the attached drawings.

BRIEF DESCRIPTION OF THE DRAWINGS

FIG. 5 is a control sequence diagram of the motor.

DESCRIPTION OF THE EMBODIMENTS

Figure 1:
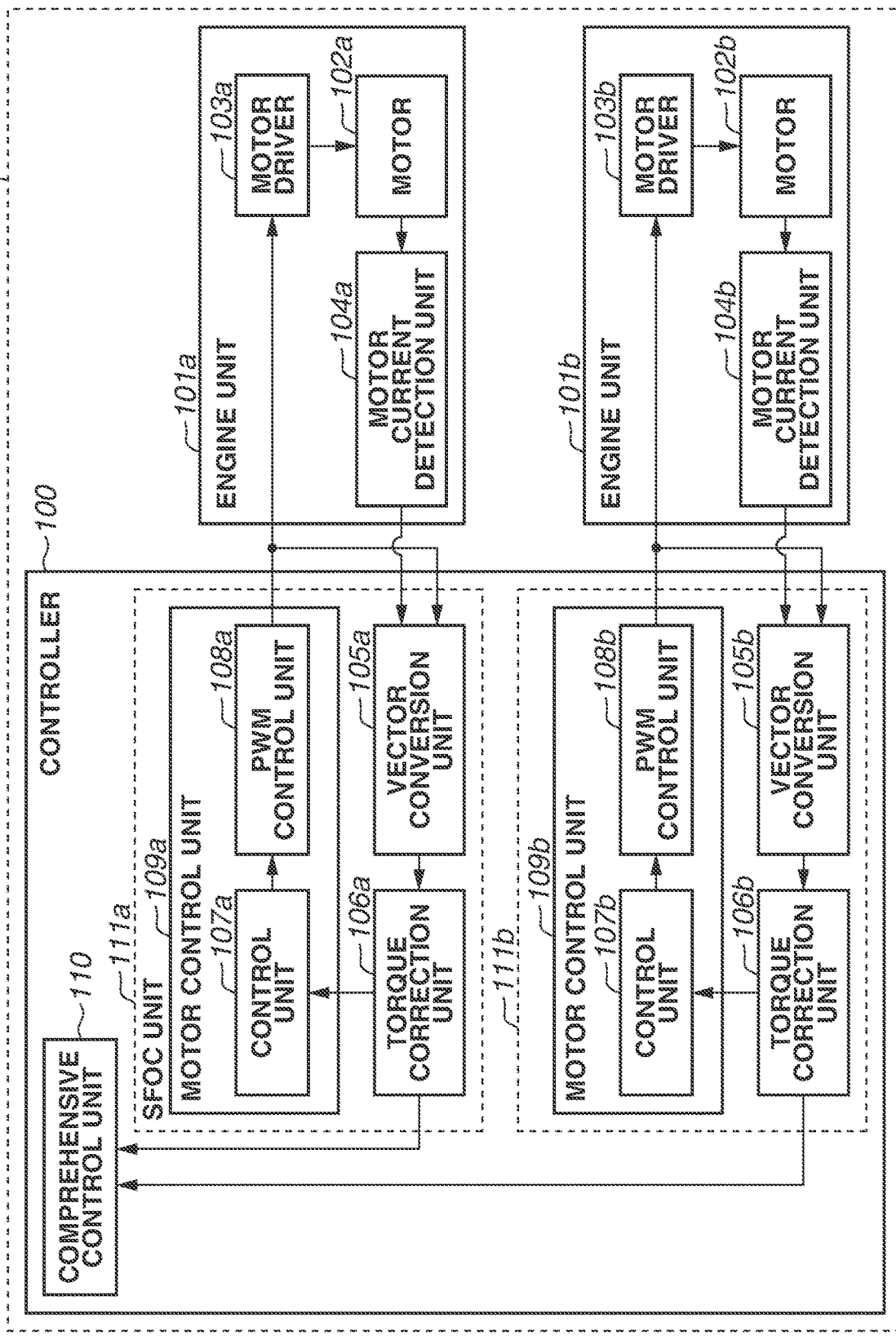
FIG. 1 is a diagram illustrating a configuration example of a motor control apparatus.

FIG. 1 is a block diagram illustrating a configuration example of a motor control apparatus 120 according to a first exemplary embodiment. The motor control apparatus 120 includes a controller 100 and a plurality of engine units 101a and 101b. The controller 100 includes a comprehensive control unit 110 and a plurality of sensorless vector control units (hereinafter referred to as sensorless field oriented control (SFOC) units) 111a and 111b.

The engine unit 101a includes a motor 102a, a motor driver 103a, and a motor current detection unit 104a. The engine unit 101b includes a motor 102b, a motor driver 103b, and a motor current detection unit 104b.

The SFOC unit 111a includes a motor control unit 109a, a vector conversion unit 105a, and a torque correction unit 106a. The motor control unit 109a includes a control unit 107a and a pulse width modulation (PWM) control unit 108a.

The SFOC unit 111b includes a motor control unit 109b, a vector conversion unit 105b, and a torque correction unit 106b. The motor control unit 109b includes a control unit 107b and a PWM control unit 108b.

The motors 102a and 102b rotate a plurality of shafts. The motor drivers 103a and 103b apply voltages to coil ends of the motors 102a and 102b, respectively, to apply currents. The motor current detection units 104a and 104b detect coil currents (values) flowing in respective phases of the motors 102a and 102b.

The vector conversion unit 105a converts the current into a torque current corresponding to a torque of the motor 102a based on two input values that are "a current value" detected by the motor current detection unit 104a and "a driving voltage" applied to each coil end of the motor 102a in the motor driver 103a. The vector conversion unit 105b converts the current into a torque current corresponding to a torque of the motor 102b based on two input values that are "a current value" detected by the motor current detection unit 104b and "a driving voltage" applied to each coil end of the motor 102b in the motor driver 103b.

The comprehensive control unit 110 outputs a correction value to the torque correction unit 106a or 106b such that a difference between the torque current of the motor 102a and the torque current of the motor 102b is reduced.

The torque correction unit 106a generates a torque current instruction value based on a value of the torque current converted by the vector conversion unit 105a in light of a target speed or a target position, and outputs a torque current instruction value provided by adding the correction value to the generated torque current instruction value to the control unit 107a. The torque correction unit 106b generates a torque current instruction value based on a value of the torque current converted by the vector conversion unit 105b in light of a target speed or a target position, and outputs a torque current instruction value provided by adding the correction value to the generated torque current instruction value to the control unit 107b.

The control unit 107a estimates a speed or a position of the motor 102a based on the torque current instruction value generated by the torque correction unit 106a, performs proportional integral calculation processing based on the estimated speed or position of the motor 102a, and outputs a driving voltage instruction value to the PWM control unit 108a. The control unit 107b estimates a speed or a position of the motor 102b based on the torque current instruction value generated by the torque correction unit 106b, performs proportional integral calculation processing based on the estimated speed or position of the motor 102b, and outputs a driving voltage instruction value to the PWM control unit 108b.

The PWM control unit 108a outputs a PWM signal to the motor driver 103a based on the driving voltage instruction value received from the control unit 107a. The PWM control unit 108b outputs a PWM signal to the motor driver 103b based on the driving voltage instruction value received from the control unit 107b.

The motor control unit 109a controls a driving voltage of the motor 102a by the PWM signal based on the torque current instruction value of the torque correction unit 106a. The motor control unit 109b controls a driving voltage of the motor 102b by the PWM signal based on the torque current instruction value of the torque correction unit 106b.

The motor driver 103a applies a pulse voltage to each coil end of the motor 102a based on the PWM signal received from the PWM control unit 108a. The motor driver 103b applies a pulse voltage to each coil end of the motor 102b based on the PWM signal received from the PWM control unit 108b. The comprehensive control unit 110 controls the engine units 101a and 101b and the SFOC units 111a and 111b.

Figure 2:
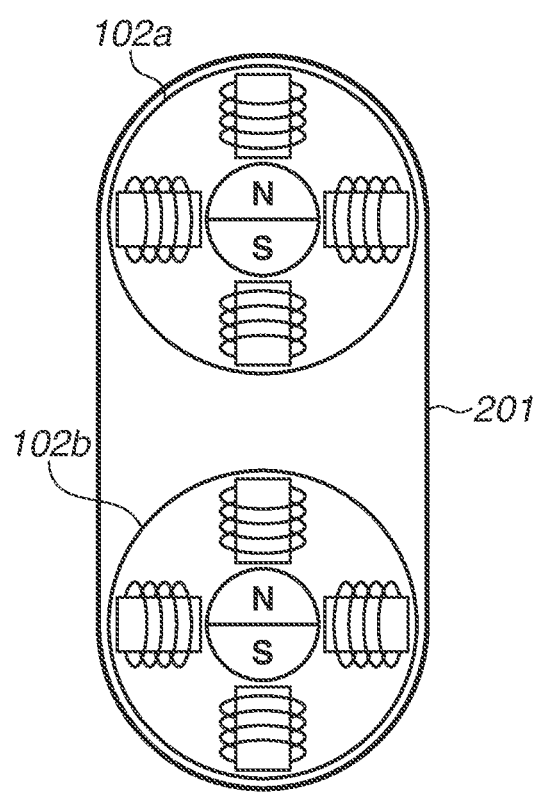
FIG. 2 is a diagram illustrating motors and a belt.

FIG. 2 is a diagram illustrating the motors 102a and 102b and a belt 201. The motors 102a and 102b are connected by the belt 201, and operate in a state in which respective rotations of the motors 102a and 102b are synchronized.

Figure 3:
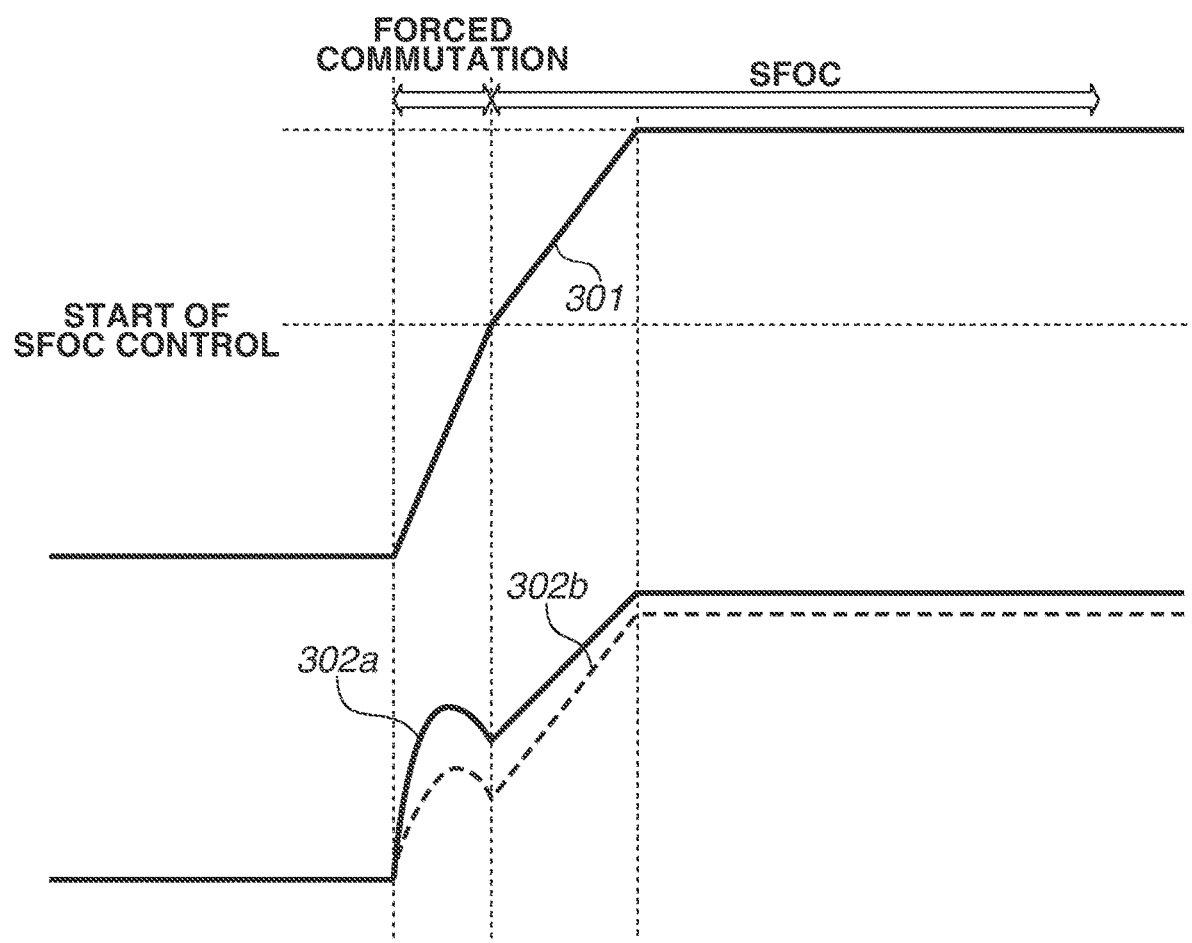
FIG. 3 is a control sequence diagram of the motor.

FIG. 3 is a diagram illustrating an example of a speed 301 of the motors 102a and 102b and torque currents 302a and 302b when the motors 102a and 102b start in a state in which loads of the two synchronized motors 102a and 102b do not match each other. The torque current 302a represents a torque current of the motor 102a, whereas the torque current 302b represents a torque current of the motor 102b. Hereinafter, a control method for the motor control apparatus 120 is described.

Forced commutation is referred to as open-loop control. In a forced commutation period, the motor control units 109a and 109b respectively control a driving voltage of the motor 102a and a driving voltage of the motor 102b regardless of a current flowing in each phase coil of the motors 102a and 102b.

After the forced commutation period, an SFOC period begins. The SFOC is referred to as feedback control. In the SFOC period, the motor control units 109a and 109b respectively control a driving voltage of the motor 102a based on a torque current instruction value for the motor 102a, and a driving voltage of the motor 102b based on a torque current instruction value for the motor 102b.

In the forced commutation period, the comprehensive control unit 110 functions as a calculation unit to calculate a correction value based on a difference between the torque current 302a of the motor 102a and the torque current 302b of the motor 102b. In the SFOC period, the torque correction unit 106a or 106b corrects the torque current instruction value using the correction value to perform control such that the torque currents 302a and 302b are eventually equal to each other.

Positions of the synchronized motors 102a and 102b may be displaced due to mechanical accuracy or aging degradation. In such a case, loads to be applied to the motors 102a and 102b become imbalanced, as described above. If loads of the motors 102a and 102b differ from each other, the torque currents 302a and 302b also differ from each other. A method for correcting the torque currents 302a and 302b is described.

A synchronization state represents a state in which a position of one motor 102a influences a position of the other motor 102b. For example, as illustrated in FIG. 2, a synchronization state is a state in which the motors 102a and 102b are connected by a member such as the belt 201. The number of motors can be three or more. Alternatively, the plurality of motors 102a and 102b can be coaxially connected in parallel. The motor control apparatus 120 controls the synchronized motors 102a and 102b.

The SFOC units 111a and 111b respectively operate the motors 102a and 102b by open-loop control referred to as forced commutation, and then the forced commutation is shifted to the SFOC. In this forced commutation period, a position of either the synchronized motor 102a or 102b is retarded or advanced.

In the forced commutation period, a position of the retarded motor 102b is retarded more and more. Consequently, a state in which the advanced motor 102a pulls the retarded motor 102b occurs, and thus the torque current 302b of the retarded motor 102b becomes smaller than the torque current 302a of the advanced motor 102a.

Here, the motor current detection units 104a and 104b detect currents flowing in each of the phase coils of the motors 102a and 102b, respectively. The vector conversion units 105a and 105b perform coordinate transformation from fixed coordinates to rotational coordinates to respectively convert the currents detected by the motor current detection units 104a and 104b into the torque currents 302a and 302b. For example, the vector conversion units 105a and 105b convert currents flowing in three-phase coils of the motors 102a and 102b into a torque current in a torque direction and a field current in a field direction.

The comprehensive control unit 110 compares magnitudes of currents of the torque currents 302a and 302b, so that a degree of retardation or advancement of positions of the motors 102a and 102b can be recognized. Within the forced commutation period, the comprehensive control unit 110 calculates, as a correction value, a difference between an average value of the torque currents 302a and 302b and the torque current 302b, which is smaller than the torque current 302a. Then, the comprehensive control unit 110 outputs the correction value to the torque correction unit 106b corresponding to the smaller torque current 302b. When the control is shifted from the forced commutation to the SFOC, the torque correction unit 106b outputs to the control unit 107b a torque current instruction value provided by adding the correction value to a torque current instruction value. In this case, the torque current instruction value of the torque correction unit 106b is corrected in only one feedback loop. The torque correction unit 106a or 106b performs correction at the first time when the control is switched from the forced commutation to the SFOC.

In a case where the torque current 302a is smaller than the torque current 302b, the torque correction unit 106a adds the aforementioned correction value to the torque current instruction value for the motor 102a. In a case where the torque current 302b is smaller than the torque current 302a, the torque correction unit 106b adds the aforementioned correction value to the torque current instruction value for the motor 102b.

Herein, in a case where the torque current instruction value to which the correction value has been added is output by the torque correction unit 106b at a moment when the control is switched from the forced commutation to the SFOC, a speed of the motor 102b markedly fluctuates. This may generate abnormal noise or cause mechanical damage.

Accordingly, in the SFOC period, the comprehensive control unit 110 gradually increases the correction value from zero for each loop every time until a target speed is reached such that the aforementioned correction value is just satisfied when the target speed is reached. In the SFOC period, the torque correction unit 106b outputs a torque current instruction value provided by adding the aforementioned correction value to a torque current instruction value. Such a torque current instruction value is output for each loop. Therefore, an impact generated by switching of the control from the forced commutation to the SFOC can be reduced, and the motors 102a and 102b can smoothly start.

In the SFOC period, the torque correction unit 106b adds a correction value to the torque current instruction value, so that a toque corresponding to the correction value is added to the retarded motor 102b. Since a load of the motor 102b pulled by the advanced motor 102a is decreased, the torque current 302a of the advanced motor 102a decreases. Thus, loads of the motors 102a and 102b are equalized, and then stabilized as the torque currents 302a and 302b in a steady state illustrated in FIG. 3.

A calculation amount of each of the SFOC units 111a and 111b is small in the forced commutation period since the SFOC units 111a and 111b generate PWM signals regardless of a current flowing in each phase coil of the motors 102a and 102b. On the other hand, a calculation amount of each of the SFOC units 111a and 111b is large in the SFOC period since the SFOC units 111a and 111b generate PWM signals corresponding to the torque current instruction values for the motors 102a and 102b. The comprehensive control unit 110 calculates the correction value in the forced commutation period, so that overall processing speeds can be equalized.

Speeds of the motor control units 109a and 109b fluctuate at the time of switching of the control from the forced commutation to the SFOC even if the torque current instruction value is not corrected. The torque correction units 106a and 106b correct the torque current instruction values in response to a shock of the switching, so that the shock of the speed fluctuation due to the correction can be concealed.

With such control, the controller 100 can eliminate a variation in loads of the plurality of motors 102a and 102b. Equalization of torques of the motors 102a and 102b reduces power consumption of the motor 102a, which has had larger power consumption. Application of equal loads to the motors 102a and 102b can extend the lifetimes of the motors 102a and 102b. The motor control apparatus 120 performs correction in the forced commutation period, so that an influence on overall calculation processing is reduced.

Figure 4:
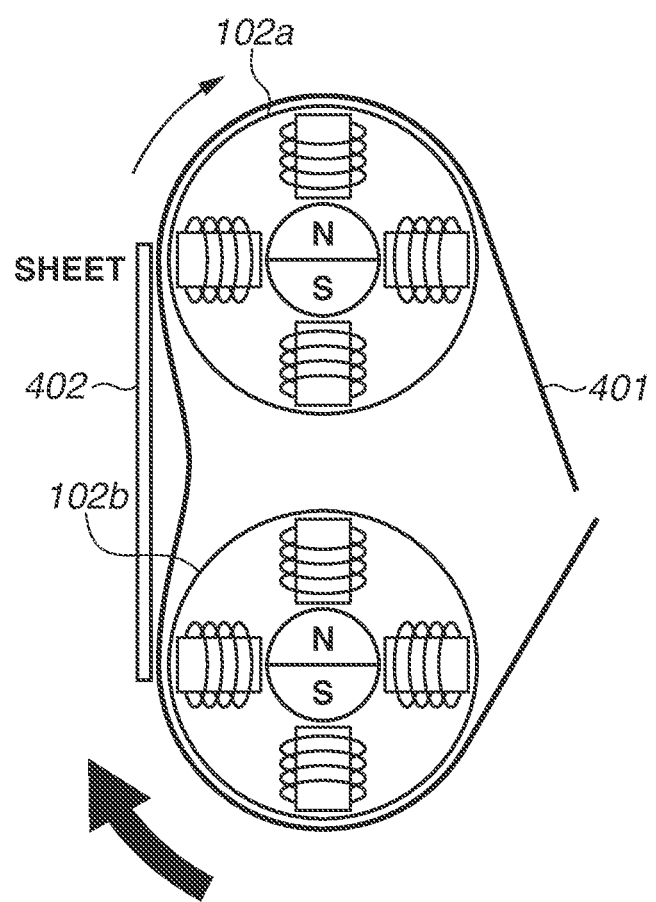
FIG. 4 is a diagram illustrating motors and a belt.

FIG. 4 is a diagram illustrating examples of the motors 102a and 102b and a belt 401 according to a second exemplary embodiment. The motors 102a and 102b convey, for example, a sheet 402. In FIG. 4, the motors 102a and 102b are connected by the belt 401, and the belt 401 has distortion.

FIG. 5 is a diagram illustrating an example of a speed 501 of the motors 102a and 102b in a state where the motors 102a and 102b are as illustrated in FIG. 4, and torque currents 502a and 502b. The torque current 502a represents a torque current of the motor 102a, whereas the torque current 502b represents a torque current of the motor 102b.

In the state illustrated in FIG. 4, the motor 102b pushes the motor 102a. Accordingly, in a forced commutation period, the torque current 502b of the motor 102b is greater than the torque current 502a of the motor 102a. In the forced commutation period, motor current detection units 104a and 104b detect currents flowing in each of phase coils of the motors 102a and 102b, respectively. In the forced commutation period, the vector conversion units 105a and 105b respectively convert the currents detected by the motor current detection units 104a and 104b into the torque currents 502a and 502b. The comprehensive control unit 110 can estimate a position of which motor is advanced or retarded based on the torque currents 502a and 502b and a rotation direction of the motors 102a and 102b. For example, in the state illustrated in FIG. 4, the torque current 502a of the motor 102a is smaller than the torque current 502b of the motor 102b with respect to a steady state in which loads of the motors 102a and 102b are equal. Hence, the comprehensive control unit 110 can estimate that a position of the motor 102a is retarded relative to a position of the motor 102b.

The comprehensive control unit 110 outputs a correction value to the torque correction unit 106a based on a result of the estimation. At a moment when control is switched from forced commutation to the SFOC, the torque correction unit 106a adds the correction value to a torque current instruction value, and outputs to a control unit 107a a torque current instruction value to which the correction value has been added. This advances a position of the motor 102a. As a result, distortion of the belt 401 is eliminated.

Similar to the first exemplary embodiment, the comprehensive control unit 110 can calculate a difference between the torque current 502a and an average value of the torque currents 502a and 502b as a correction value. The correction value is used for correction to eliminate an event such as distortion of the belt 401. Accordingly, the comprehensive control unit 110 can calculate a value that is greater than a difference between the torque current 502a and an average value of the torque currents 502a and 502b as a correction value.

In a case where the torque current 502a is smaller than the torque current 502b, the torque correction unit 106a adds the aforementioned correction value to a torque current instruction value for the motor 102a. In a case where the torque current 502b is smaller than the torque current 502a, the torque correction unit 106b adds the aforementioned correction value to a torque current instruction value for the motor 102b.

If a load of the motor 102a increases with respect to a load of the motor 102b, a state in which the motor 102a pulls the motor 102b is provided. Thus, the belt 401 acts more in a stretch direction. The torque correction unit 106a or 106b performs correction such that distortion of the belt 401 is reduced.

With such control, the controller 100 can eliminate distortion of the belt 401, which connects the plurality of motors 102a and 102b. The motor control apparatus 120 detects the distortion of the belt 401 from the torque currents 502a and 502b, so that the distortion of the belt 401 can be corrected.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2019-236293, which was filed on Dec. 26, 2019 and which is hereby incorporated by reference herein in its entirety.

What is claimed is:

1. A motor control apparatus that controls a first motor and a second motor that are synchronized, the motor control apparatus comprising:
    circuitry that implements:
    a first conversion unit configured to convert a current flowing in the first motor into a torque current;
    a second conversion unit configured to convert a current flowing in the second motor into a torque current;
    a first torque correction unit configured to output a torque current instruction value for the first motor based on the torque current of the first motor;
    a second torque correction unit configured to output a torque current instruction value for the second motor based on the torque current of the second motor;
    a first motor control unit configured to control a driving voltage of the first motor based on the torque current instruction value for the first motor; and
    a second motor control unit configured to control a driving voltage of the second motor based on the torque current instruction value for the second motor,
    wherein the first torque correction unit or the second torque correction unit corrects the torque current instruction value for the first motor or the torque current instruction value for the second motor based on the torque current of the first motor and the torque current of the second motor, and
    wherein the first motor control unit and the second motor control unit control, in a period of open-loop control, the driving voltage of the first motor and the driving voltage of the second motor regardless of a current flowing in the first motor and a current flowing in the second motor, and
    wherein the first motor control unit and the second motor control unit control, in a period of feedback control different from the period of the open-loop control, the driving voltage of the first motor based on the torque current instruction value for the first motor, and the driving voltage of the second motor based on the torque current instruction value for the second motor.

2. The motor control apparatus according to claim 1, wherein the period of feedback control is subsequent to the period of the open-loop control.

3. The motor control apparatus according to claim 2, wherein the circuitry further implements: a calculation unit configured to calculate a correction value in the period of the open-loop control based on the torque current of the first motor and the torque current of the second motor,
    wherein the first torque correction unit or the second torque correction unit uses the correction value to perform correction in the period of the feedback control.

4. The motor control apparatus according to claim 3, wherein the first torque correction unit or the second torque correction unit performs correction at a first time when control is switched from the open-loop control to the feedback control.

5. The motor control apparatus according to claim 4, wherein the calculation unit calculates as the correction value a difference between an average value of the torque current of the first motor and the torque current of the second motor and the torque current of the first motor or the torque current of the second motor,
    wherein, in a case where the torque current of the first motor is smaller than the torque current of the second motor, the first torque correction unit adds the correction value to the torque current instruction value for the first motor, and
    wherein, in a case where the torque current of the second motor is smaller than the torque current of the first motor, the second torque correction unit adds the correction value to the torque current instruction value for the second motor.

6. The motor control apparatus according to claim 4, wherein, in the period of the feedback control, the first torque correction unit or the second torque correction unit adds a correction value that is gradually increased to the torque current instruction value for the first motor or the torque current instruction value for the second motor.

7. The motor control apparatus according to claim 3, wherein the first motor and the second motor are connected by a belt, and
    wherein the first torque correction unit or the second torque correction unit performs correction such that distortion of the belt is reduced.

8. The motor control apparatus according to claim 7, wherein the calculation unit calculates as the correction value a value greater than a difference between an average value of the torque current of the first motor and the torque current of the second motor and the torque current of the first motor or the torque current of the second motor,
    wherein, in a case where the torque current of the first motor is smaller than the torque current of the second motor, the first torque correction unit adds the correction value to the torque current instruction value for the first motor, and wherein, in a case where the torque current of the second motor is smaller than the torque current of the first motor, the second torque correction unit adds the correction value to the torque current instruction value for the second motor.

9. The motor control apparatus according to claim 1, wherein the first motor and the second motor are connected by a belt.

10. A control method for a motor control apparatus that controls a first motor and a second motor that are synchronized, the control method comprising:
- first-converting a current flowing in the first motor into a torque current;
- second-converting a current flowing in the second motor into a torque current;
- first-outputting a torque current instruction value for the first motor based on the torque current of the first motor;
- second-outputting a torque current instruction value for the second motor based on the torque current of the second motor;
- first-motor-controlling a driving voltage of the first motor based on the torque current instruction value for the first motor; and
- second-motor-controlling a driving voltage of the second motor based on the torque current instruction value for the second motor,
- wherein the first-outputting or the second-outputting corrects the torque current instruction value for the first motor or the torque current instruction value for the second motor based on the torque current of the first motor and the torque current of the second motor,
- wherein the first-motor-controlling and the second-motor-controlling control, in a period of open-loop control, the driving voltage of the first motor and the driving voltage of the second motor regardless of a current flowing in the first motor and a current flowing in the second motor, and
- wherein the first-motor-controlling and the second-motor-controlling control, in a period of feedback control different from the period of the open-loop control, the driving voltage of the first motor based on the torque current instruction value for the first motor, and the driving voltage of the second motor based on the torque current instruction value for the second motor.

* * * * *